United States Patent
Bartlett, Jr. et al.

[15] 3,659,709
[45] May 2, 1972

[54] METHOD AND APPARATUS FOR SORTING FLOWERS

[72] Inventors: David S. Bartlett, Jr.; Rupert M. Purcell; David W. Osborne; Troy F. Smith, Jr., all of San Jose, Calif.

[73] Assignee: Floral Grading Inc., Sunnyvale, Calif.

[22] Filed: Mar. 23, 1970

[21] Appl. No.: 21,771

[52] U.S. Cl. ...................................................... 209/82
[51] Int. Cl. ............................................................ B07c 1/14
[58] Field of Search ..................... 209/82, 108, 111.7, 72–74, 209/122–125

[56] References Cited

UNITED STATES PATENTS

| | | | |
|---|---|---|---|
| 3,401,796 | 9/1968 | Hagiz | 209/82 X |
| 3,517,809 | 6/1970 | Gregoire | 209/122 |

Primary Examiner—Richard A. Schacher
Attorney—Paul B. Fihe

[57] ABSTRACT

The invention is a method and apparatus for sorting flowers on the basis of stem length. Flowers of random stem lengths are arranged on a first conveyor with their stems aligned in substantially vertical parallel relation. A series of stem length detectors sense various stem lengths whereupon all flowers of similar length are transferred to a corresponding one of a series of storage conveyors. When a desired quantity of similar sized flowers are stored in the storage conveyor, they are transferred by a transfer conveyor to a terminal conveyor where they are grouped for tying and wrapping. Any number of preselected lengths may be grouped but the extremes in stem length are selected first, e.g. the longest, proceeding to the opposite extreme so that the stem length detectors operate like a sieve.

21 Claims, 9 Drawing Figures

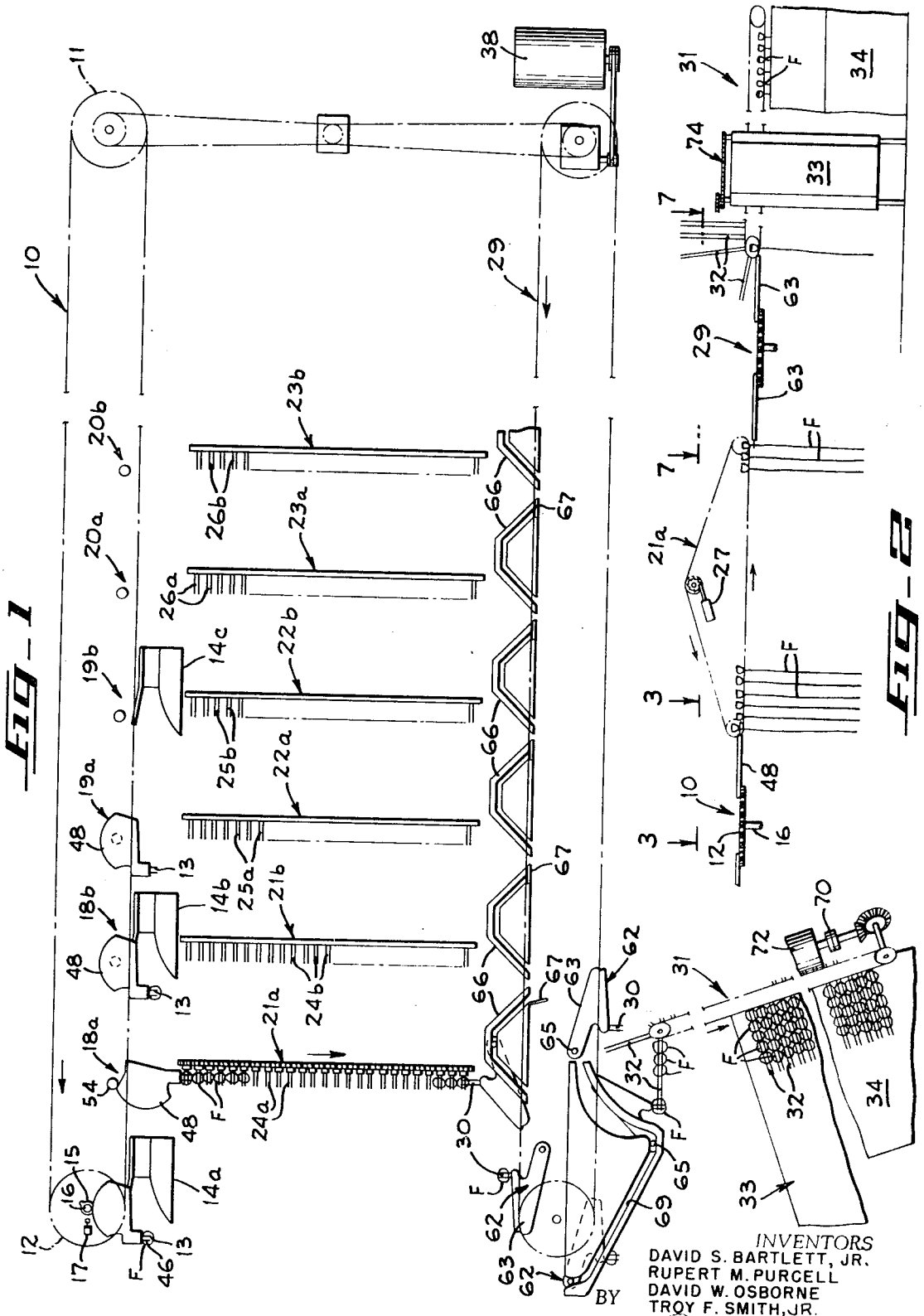

PATENTED MAY 2 1972 3,659,709
SHEET 2 OF 3
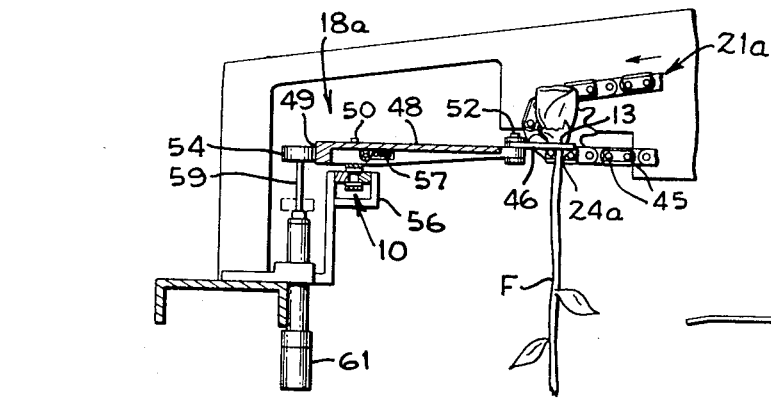
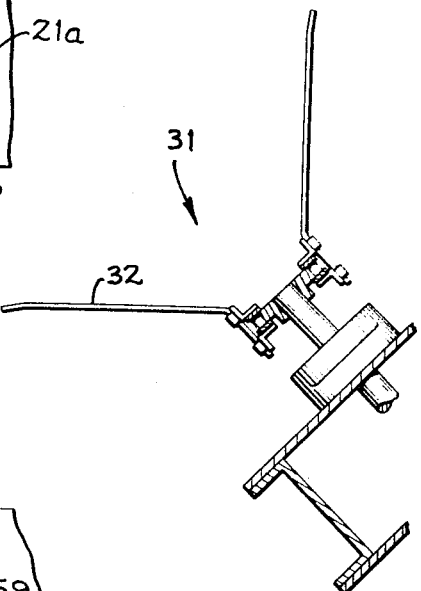
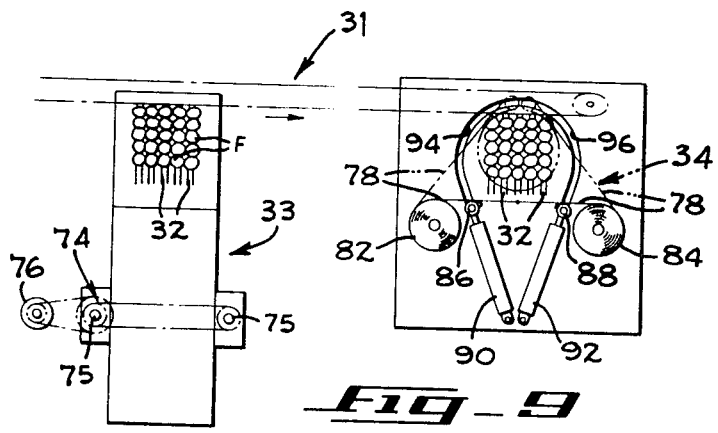
INVENTORS
DAVID S. BARTLETT, JR.
RUPERT M. PURCELL
DAVID W. OSBORNE
TROY F. SMITH, JR.
BY
PATENT AGENT PATENTED MAY 2 1972
3,659,709
SHEET 3 OF 3
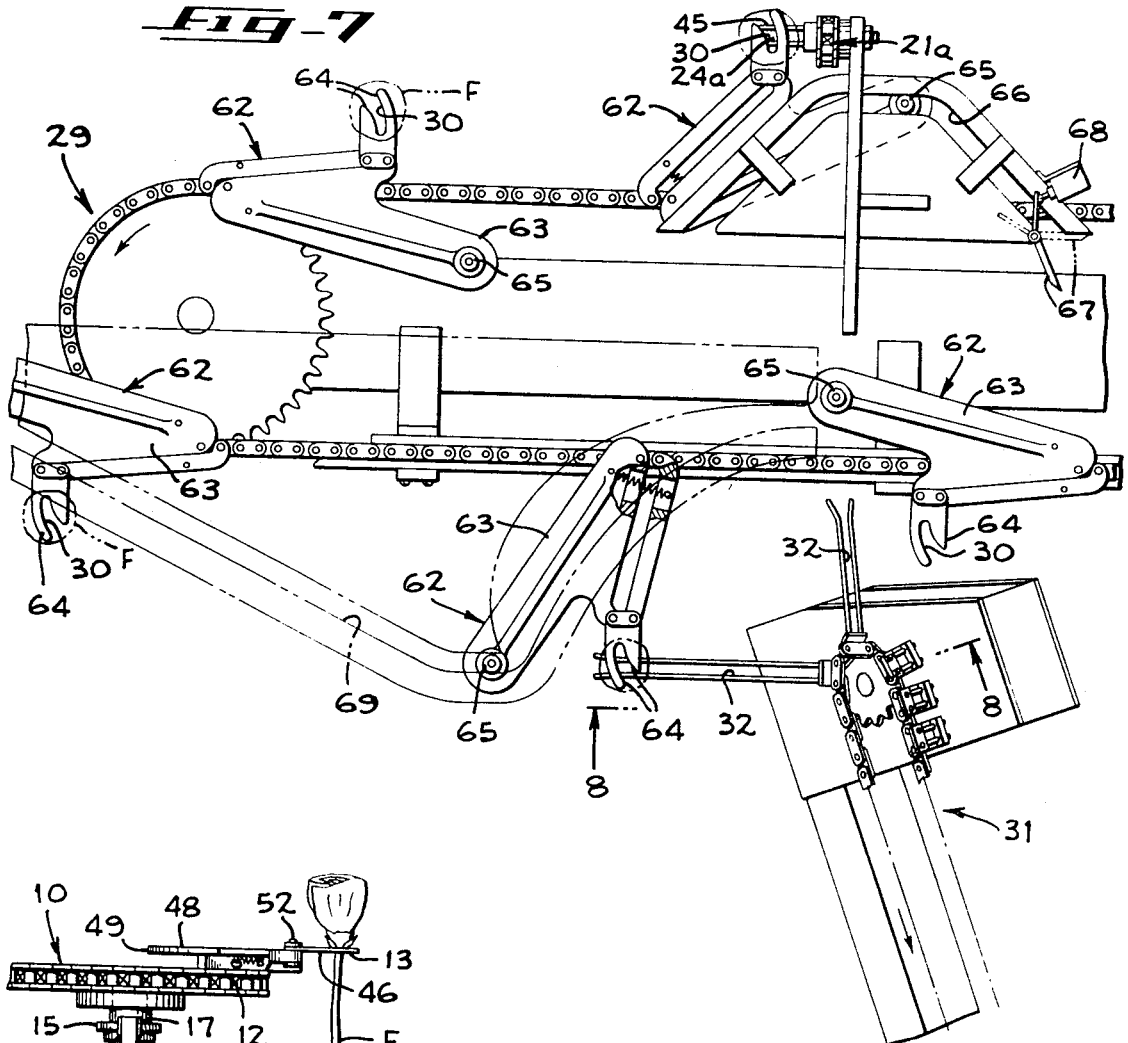
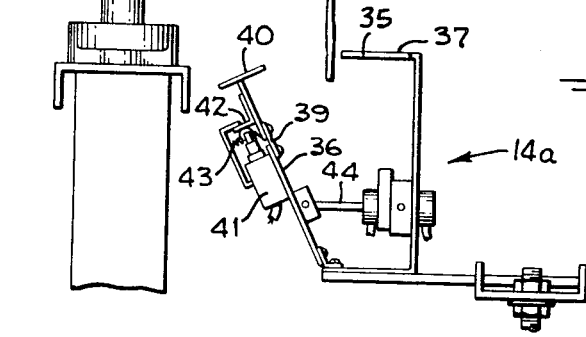
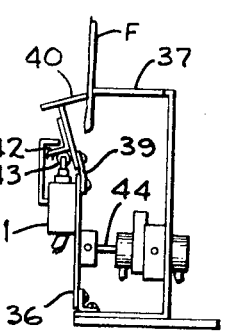
INVENTORS
DAVID S. BARTLETT, JR.
RUPERT M. PURCELL
DAVID W. OSBORNE
TROY F. SMITH, JR.
BY
PATENT AGENT

METHOD AND APPARATUS FOR SORTING FLOWERS

BACKGROUND OF THE INVENTION

The invention pertains to a method and apparatus for sorting articles on the basis of length, and more particularly to the sorting of flowers on the specific basis of stem length.

One of the problems existing in commercial horticulture is the time consumed in preparing individual flowers for final packaging. A great amount of this time is spent in the manual sorting flowers on the basis of stem length. Unfortunately, this expenditure of time increases the costs of flowers dramatically since most of the care given to flowers up to the time of harvesting is administered through large scale operations which divide costs over the entire crop. Yet flowers sorted and sold on the basis of length, especially roses and carnations, introduce a relatively high amount of labor costs after harvesting. One reason why mechanical methods of automated sorting have heretofore failed is the fragility of flowers.

SUMMARY OF THE INVENTION

Therefore, it is the object of the present invention to provide an automated method and apparatus for sorting flowers on the basis of stem length while providing for gentle machine handling of each flower.

The above object is achieved with a method and apparatus wherein random stem length flowers are arranged in a general queue, e.g. on a first loading conveyor, and moved relative to at least one stem length detector. The flower stems are placed in pockets in substantially vertical parallel relation which enable each detector to signal the presence of a flower stem greater than a preselected length. Whether one or more detectors are used, each is positioned relative to said general queue so that flowers of one extreme in length, e.g. the longest, are removed first and then the next longest and so on. When the detector signals the presence of a flower stem longer than a preselected length the flower is transferred to a storage queue, i.e. a storage conveyor holding only flowers having a uniform stem length. At this point the flowers may either be grouped at the storage conveyor for tying, or if many storage conveyors are utilized for holding different stem lengths, each may be unloaded onto a transfer conveyor feeding a terminal conveyor whereon sequential tying and wrapping operations are performed. The invention will be better understood with reference to the Figures.

BRIEF DESCRIPTION OF THE DRAWINGS

FIG. 1 is an overall top plan view of one apparatus embodying the invention.

FIG. 2 is a side elevational view of the apparatus as viewed from the left of FIG. 1.

FIG. 3 is an enlarged fragmentary top plan view of a flower detector means and associated transfer means as viewed looking in the direction of the arrows 3—3 in FIG. 2.

FIG. 4 is an enlarged side elevational view of a detector means as seen by looking in the direction of the arrows 4—4 in FIG. 3.

FIG. 5 is a fragmentary operational view of the detector means of FIG. 2 wherein the detector means is detecting the presence of a flower stem with a stem length extending into the detector.

FIG. 6 is a fragmentary sectional view of the flower transfer means illustrated in FIG. 3 as viewed along the direction of the arrows 6—6 of FIG. 3.

FIG. 7 is an enlarged fragmentary top plan view of a flower transfer conveyor and terminal conveyor as viewed looking in the direction of the arrows 7—7 in FIG. 2.

FIG. 8 is a fragmentary sectional view of the terminal conveyor as viewed looking along the direction of the arrows 8—8 in FIG. 7.

FIG. 9 is a plan view somewhat diagrammatic in nature, illustrating tying and wrapping units.

DESCRIPTION OF THE PREFERRED EMBODIMENT

With initial and general reference to FIGS. 1 and 2, an exemplary embodiment of the flower sorting apparatus includes a loading conveyor 10 preferably in the form of an endless link chain conveyor supported about spaced sprockets 11, 12 for operation in substantially a horizontal plane and at an elevation such that one or more attendants can conveniently load or place individual flowers F in succession in individual pockets 13 in the form of parallel tines 46 supported to project outwardly from the periphery of the loading conveyor 10 at equally spaced intervals. More particularly, the bud of the flower F is placed by the attendant above the spaced tines so that the calyx rests thereon with the elongated stem of the flower hanging downwardly and thus in spaced parallel relation to other flower stems loaded onto other pockets 13 on the conveyor in a similar fashion. The loading conveyor 10 is driven by a suitable motor 38 continuously with the described loading operation taking place along one flight of the conveyor and with a series of similar detector means 14a, 14b, 14c, etc. positioned adjacent the opposite flight of the conveyor so as to detect the presence of a flower of predetermined stem length. Each successive detector means 14a, 14b, 14c, etc. is positioned at a slightly higher elevation so that first the flowers of longest stem length are detected and subsequently the successive detector means will sense stem lengths which are shorter. In the specific case of sorting roses, stem length increments between the successive detector means is preferably about 2 inches and a series of approximately 12 detector means are used although only three 14a, 14b, and 14c are illustrated in FIG. 1.

In order to instigate operation of the detector means, 14a, 14b, 14c, a cam 15 may be positioned on one of the conveyor sprocket-supporting shafts 16 as illustrated in FIGS. 1 and 3 to periodically close a micro-switch 17 which, in turn, energizes the simultaneous stem-sensing operation of all detector means 14a, 14b, 14c, etc. as the flower-supporting pockets 13 pass thereover as will be described in detail hereinafter. The displacement of the pockets 13 along the conveyor 10 and the detector means is equalized to permit such simultaneous actuation of all detector means 14a, 14b, 14c, etc. If any one of the detector means 14a, 14b, 14c senses the presence of a flower having a predetermined stem length, a selected one of a pair of flower-transfer means 18a, 18b, 19a, 19b 20a, 20b, etc. is energized to, in turn, transfer that particular flower from its pocket 13 on the loading conveyor 10 onto the associated one of a pair of like storage conveyors 21a, 21b, 22a, 22b, 23a, 23b, etc. each of which is in the form of an endless sprocket chain supported about spaced sprockets in substantially a vertical plane and having a sequence of flower storage pockets 24a, 24b, 25a, 25b, etc. projecting horizontally therefrom at closely spaced intervals. Preferably, for commercial purposes, each storage conveyor includes twenty-five of such pockets along its lower flight which is arranged to move incrementally from left to right as viewed in FIG. 2 a space equivalent to the distance between two of the pockets upon intermittent actuation of a drive sprocket by a ram-actuated ratchet assembly 27 which is suitably actuated after each flower transfer from the loading conveyor 10 to the storage conveyor as will be described in detail hereinafter. A counter (not shown) is associated with each storage conveyor so that upon accumulation of a full load of 25 flowers on a given storage conveyor, further actuation of the same detector means will effect transfer of further flowers of the same length to the second storage conveyor associated with that same detector means. That is, if storage conveyor 21a, is filled, further flowers F detected by detector means 14a will then be delivered to storage conveyor 21b.

Under suitable electronic control, a transfer conveyor 29 in the form of an endless link-chain conveyor supported by sprockets in substantially a horizontal plane with one flight closely adjacent the remote ends of the storage conveyors 21a, 21b, 22a, 22b, 23a, 23b, etc. is continuously driven by the motor 38 to bring in sequence a plurality of pockets 30 into transfer relation with the successive pockets 24a, 24b, 25a, 25b, 26a, 26b on one of the storage conveyors 21a, 21b, 22a, 22b, 23a, 23b to completely unload flowers therefrom for subsequent transfer in groups of 25 to a terminal conveyor 31 for subsequent tying and wrapping of a group of 25 flowers. Preferably, the transfer conveyor 29 has 25 pockets 30 disposed at equal intervals along its entire length so that one complete cycle of the transfer conveyor is capable of unloading and transferring the 25 flowers from a particular storage conveyor. As the transfer conveyor 29 moves, the storage conveyor 21a, 21b, 22a, 22b, 23a, 23b being unloaded will be moved in appropriate increments by a suitable control means to be described hereinafter so that as each pocket 30 arrives adjacent the discharge end of the storage conveyor, a loaded pocket 24a, 24b, etc. on the storage conveyor 21a, 21b, etc. is brought into appropriate position to enable removal of that individual flower.

Whereas one flight of the transfer conveyor 29 moves adjacent the exit or discharge ends of all of the storage conveyors 21a, 21b, 22a, 22b, 23a, 23b, the other flight of this same conveyor moves adjacent the mentioned terminal conveyor 31 which again is in the form of an endless link chain conveyor supported in an angular plane on suitable spaced sprockets and driven in increments through intermittent actuation. This terminal conveyor 31 supports groups of five closely-spaced elongated pockets 32, each of which is adapted to receive five flowers from the pockets 30 of the transfer conveyor 29 whereupon control means actuate small incremental movement of the terminal conveyor to bring the next pocket 32 into position for reception of the succeeding five flowers from the transfer conveyor 29.

After the group of five elongated pockets 32 have been fully loaded, additional control means effect more extensive movement of the terminal conveyor 31 to bring the loaded group of five pockets into a position intermediate the full length of the conveyor 31 adjacent a tying mechanism 33 and a succeeding group of five empty elongated pockets into position for receiving a successive group of 25 flowers from the transfer conveyor 29 thus to expedite the entire operation. The tying mechanism 33 can constitute a standard commercially-available Bunn Package Tying Machine which is automatically energized when a group of 25 flowers F is suspended from the terminal conveyor 31 thereabove.

While the tying operation is proceeding, the first of the successive group of five pockets 32 is being filled and upon completion of such filling of one pocket 32, small incremental motion of the terminal conveyor 31 again takes place. After all five pockets 32 are fully loaded, the more extensive motion of the terminal conveyor 31 is once again instigated to bring the freshly-loaded pockets 32 to the tying mechanism position and to simultaneously bring the previously tied group to a position at the remote end of the terminal conveyor 31 adjacent a wrapping mechanism 34 arranged to place a wrapping around the tied group of flowers. The wrapping can be of thin plastic, paper or other materials although a plastic wrap is preferred since it lends itself readily to the automatic rapid operation of the entire machine.

With such general structural and operation description in mind, details of the individual elements and their operation will be more readily understood by reference to the more detailed Figures of the drawing.

With particular reference to FIGS. 3, 4, and 5 an individual flower F suspended from a pocket 13 on the loading conveyor 10 is shown entering the first detector means 14a which includes a flower stem guide 35, a shelf 37 and an arm 36 equipped with a blade 40. The height of the shelf 37 is set to detect flowers having stem lengths longer than a preselected length. The arm 36 and the connected blade 40 are adapted to pivot toward and away from the shelf 37 in a path which will not intersect with the shelf. The path of the blade 40 should be transverse to the flower stem position so that the flower stem will pass between the blade 40 and the shelf 37 when in its open inoperative position as shown in FIG. 4. The arm 36 includes a pair of hinged portions connected with the hinge 39 at an intermediate point along the length of the arm 36. The arm is subject to bending at the hinge 39. A signal means 41, such as a microswitch, mounted behind the arm 36 will detect bending. Such detection is achieved by mounting a finger 42 just above a trip lever 43 for the signal means 41. The relation of the finger 42 to the trip lever 43 is such that slight bending of the arm 36 will cause the hinge member 39 carrying the finger 42 to move with respect to the trip lever thereby activating the signal means 41.

When a flower F has moved to a fully entrant position between the blade 40 and the shelf 37 and the detector means 14a has been actuated by the previously described cam-actuated switch 17 which, in turn, energizes a pneumatic ram 44, the arm 36 is moved from the FIG. 4 position to the detection position shown in FIG. 5. As the flower F occupies the fully entrant position between the blade 40 and the shelf 37, the ram 44 brings the lower-hinged portion of the arm 36 to an approximately vertical position below the stem of the flower F. This position of the lower hinged portion brings the blade 40 into contact with the flower stem and causes the upper hinged portion of the arm 36 to be bent backward from the hinge 39. The inclined position of the upper hinged portion forces the finger 42 to depress the trip lever 43 thereby causing the signal means 41 to signal the presence of a flower having a stem extending beyond the predetermined position of the shelf 37. Once the signal means 41 of the detector means 14a emits a signal indicative of detection of the flower F, the ram 44 once again relaxes to the open inoperative position shown in FIG. 4.

The amount of pressure required to trip the signal means 41 is kept at a few ounces so that the blade 40 will not injure the stem of the flower F. If a flower with much shorter stem passed over the detector 13, such stem would not be interposed between the blade 40 and the shelf 37. The blade 40 would pass below the shelf 37 at a distance slightly spaced therefrom. Since a stem would not cause the arm 36 to be bent backward there would be no signal emitted from the signal means 41 and the arm 36 would once again open to the position shown in FIG. 4. However, once the detector means 14a detects a flower having a stem greater than a predetermined length, a signal is transmitted to the appropriate flower transfer means 18a so that the flower which has been detected may be transferred to the associated appropriate storage conveyor 21a. It is to be observed that the slight spacing between shelf 37 and blade 40 permit sliding encompassment of a leaf without actuation of the detector means 14a, thus avoiding sensing leaves instead of stems.

The signal developed from the detector means 14a actuates unloading of one of the flower-supporting pockets 13, as best illustrated in FIGS. 3 and 6 through actuation of the associated flower-transfer means 18a, 18b. The members of the pocket 13 include the mentioned parallel pair of tines 46 which are spaced a slight distance to allow passage of a flower stem between them. The pair of tines 46 is mounted on a rack 47 which maintains the spaced relationship therebetween as well as their angular orientation and accordingly, forms a three-sided pocket. The rack 47 is secured to a cam follower 48 which has a principal cam surface 49 forming an element of the flower transfer means 18a. The cam follower 48 is pivotally mounted to chain links of the loading conveyor 10 by a spring pin 50 which extends through the cam follower 48 and into the links of conveyor 10. The spring pin 50 is set to keep the cam follower 48 with the rack 47 proximate to the conveyor 10. A hinge pin 52 through the cam follower 48 enables the cam follower to support one side of the rack 47. A second side of the rack 47 is supported by a hinge pin 55 through a cam follower guide 51 which is itself independently pivotally mounted to chain links of the first conveyor 10 by the spring pin 53. The pins used in the pocket 13 allow the cam follower 48 as well as the cam follower guide 51 to swivel outwardly but to tend to return to a position where the rack 47 is close to the conveyor 10. When a cam forming another part of the flower-transfer means 18a such as the cam wheel 54 to be described hereinafter abuts the cam surface 49, the cam follower guide 51 precedes the cam follower 48 pushing the rack 47 until the orientation of the rack is suitable for flower transfer to a pocket 24a, 24b, etc. on the appropriate storage conveyor 21a, 21b, etc. as illustrated at the right of FIG. 3.

The cam 54 for abutting the cam surface 49 is arranged to reciprocate with an up and down motion so that the cam surface 49 may be engaged upon command from the appropriate detector means, as will be described, and as best illustrated in FIG. 6. When the cam wheel 54 abuts the cam surface 49, the rack 47 will be forced outwardly away from the conveyor 10. A conveyor restrainer 56 is placed over the outside edges of the conveyor 10 so that the torque exerted by the extended cam surface 49 will not cause the conveyor to flip over. When the cam follower 48 is extended outwardly, the cam follower guide 51 is also forced outward but because the guide 51 supports one side of the rack 57 at the pin 55, the rack 47 will maintain a generally horizontal orientation since the length of the guide 51 and the cam surface 49 are approximately equal in their outward extent. When the cam surface 49 passes the cam wheel 54, the cam surface will tend to rotate inwardly about the two spring pins 50, 53 connected to the conveyor 10.

An internally connected spring 57 within the cam follower 48 joins the cam follower 48 to the cam follower guide 51 and pulls the guide toward the most relaxed position of the spring 57. This relaxed position is found when the cam follower guide 51 rests directly against the cam surface 49 as when the cam follower 48 is pulled back by the spring pins 50, 53 to a position wherein the cam follower guide 51 is approximately parallel to the direction of travel of the conveyor 10, as shown at the left of FIG. 3.

As shown in FIG. 6, the cam wheel 54 has a shaft 59 which is activated by a cam solenoid 61. The cam solenoid 61 is activated by the signal from the detector means 14a which signals the presence of a flower having a stem length greater than a preselected length to be transferred to a conveyor such as the storage conveyor 21a, as previously described. When such a signal is received, the cam wheel 54 is sent to its upper position where it can be engaged by the cam follower 48 so to urge pocket 13 outward whereupon the pocket moves toward the open side of the storage pocket 24a along the direction indicated by the arrow A thus to permit transfer the flower F into flower storage pocket 24a of the conveyor 21a. As soon as this operation is complete, the pocket 13 tends to move inwardly under actuation of the spring 57 as the pocket advances with the conveyor 10. Cam wheel 54 subsequently relaxes to its lower inoperative position as the cam solenoid 61 is deenergized.

More particularly, as clearly shown in FIG. 3, the tines 46 of the pocket 13 carried by the loading conveyor 10 to the right in that Figure are disposed in perpendicular relation over the spaced tines 45 forming the storage pocket 24a and thus deliver a flower F thereonto as the two pockets 13, 24a arrive at the illustrated overlapping position. Immediately thereafter, the cam follower surface 49 is such that the tines 46 of the pocket 13 move in a transverse direction (upwardly as shown by the arrow B in FIG. 3), leaving the flower F in the storage pocket 24a. Upon completion of the transfer, incremental motion of the storage conveyor 21a by the mentioned ratchet assembly 27 is instigated by control means to be described hereinafter, thus to bring the next empty storage pocket 24a into flower receiving position.

Up to this point flowers F have been sorted according to stem length on the respective storage conveyors 21a, 21b, etc. A review of these operations may be had with reference to FIG. 1. It will be seen that the loading conveyor 10 moves flowers F to the first detector means 14a whereupon, if a particular flower at that detector means is longer than a preselected stem length, it is detected and placed on one of the two storage conveyors 21a, 21b by a respective one of the first pair of flower transfer means 18a, 18b. While one of the two storage conveyors 21a, 21b is receiving flowers from the loading conveyor 10, it may not discharge flowers to the transfer conveyor 29. On the other hand, if one of the storage conveyors 21a, 21b is transferring flowers to the transfer conveyor 29, an operation which is performed only when a storage conveyor is filled, then that conveyor may not receive flowers from the loading conveyor 10. While such alternate loading and unloading operations of the storage conveyors can be controlled manually, an electrical arrangement for automatically loading and unloading these conveyors is preferred as described below.

Adjacent the opposite ends of the storage conveyors 21a, 21b etc., additional flower transfer means 62 operatively associated with the pockets 30 on the transfer conveyor 29 are arranged to transfer flowers from the pockets 24a, 24b, etc. of the storage conveyors 21a, 21b, etc. to the pockets 30 of the transfer conveyor 29. The manner in which the transfer conveyor 29 is thus loaded may be seen more clearly with additional reference to FIG. 7. The loading of the transfer conveyor pockets 30 with flowers in succession from the pockets 24a, 24b, etc. of the storage conveyors 21a, 21b, etc. is carried out using a series of flower transfer means 62 somewhat similar to those for transferring flowers from the loading conveyor 10 to the storage conveyors 21a, 21b, etc. Each transfer means 62 includes a cam follower 63 which functionally corresponds to the cam follower 48 but differs in structural detail. Each cam follower 63 supports the associated pocket 30 in the form of a pair of tines 64 which project outwardly in slightly forwardly curved or hooked configuration thus to facilitate pick up of a flower from the appropriate storage conveyor pocket 24a, 24b, etc.. At spaced intervals along the transfer conveyor 29, the cam followers 63 are supported for pivotal motion about substantially vertical axes and each mounts on a vertical pin a roller 65 arranged to engage a selected cam in the form of a curving cam track 66 supported adjacent the end of each storage conveyor 21a, 21b, etc.. As the roller 65 moves along one cam track 66, the entire cam follower 63 is pivoted outwardly to bring the supported pocket 30 into flower transfer relation with the adjacent pocket 24a, 24b, etc. of the storage conveyor 21a, 21b, etc., the action being generally similar to the transfer of flowers from the pockets 13 to the storage pockets 24a, 24b, etc.. However, it is to be observed that the pockets 30 on the transfer conveyor 29 are moving toward the open side of the pockets 24a, 24b, etc. since the upper flight of the transfer conveyor 29 moves from right to left as viewed in FIG. 7 and the described curvature of the tines 64 assures proper pick up of the flower F.

A normally-closed gate 67 is positioned at the entrance end of each cam track 66 to normally preclude the pivoted transfer action of the pockets 30, but when a particular storage conveyor (e.g. 21a) is filled 25 the mentioned counter actuates a solenoid 68 to open the gate 67 whereupon each pocket 30 is in succession brought into flower transfer relation, as shown in FIG. 7.

As the loaded pockets 30 move around the transfer conveyor 29, a fixed cam track 69 which curves gradually outwardly and then abruptly inwardly adjacent the opposite flight urges each pocket to move outward, thereby enabling flowers to be similarly transferred in sequence from the transfer conveyor pockets 30 to the elongated pockets 32 of the terminal conveyor 31 also as most clearly shown in FIG. 7. The tines of the pockets 32 are of sufficient length that a plurality of flowers may be placed thereon. For example, roses are usually sold in bunches of twenty-five flowers each. Hence, it is convenient to place groups of five flowers in sequence in five consecutive pockets 32, as shown in FIG. 1, thus to provide a substantially square symmetrical grouping to facilitate the subsequent tying and wrapping operations.

To preclude interference with the transfer of flowers F into the pockets 32 or with the subsequent tying and wrapping operations, the tines are disposed at an angle of approximately 45° relative to the conveyor 31 and, in turn, the conveyor itself is in the form of an endless link chain conveyor having a planar disposition of approximately 45°, as can be best visualized by reference to FIG. 8. As a consequence, the tines of the right-hand, upper flight of the terminal conveyor project substantially vertically as clearly illustrated in FIG. 8 and, in turn, the tines which project from the lower flight of the conveyor are in substantially a horizontal disposition, thus to permit at one end of this flight the loading of the tines from the transfer conveyor pockets 30 as illustrated in FIG. 7 and the subsequent tying and wrapping operations at other positions on this flight of the terminal conveyor as best illustrated in FIG. 9.

As mentioned, the transfer of each individual flower F from each pocket 30 on the transfer conveyor 29 to one of the pockets 32 on the terminal conveyor 31 is generally similar to the transfer from the pockets on the loading conveyor 10 to those of the storage conveyors 21a, 21b, etc. and will accordingly not be repeated in further detail. However, a counter control means described hereinafter is arranged to instigate incremental motion of the terminal conveyor 31 after five flowers have been loaded into one terminal conveyor pocket 32 so as to bring the subsequent pocket to flower-receiving position. After a group of five pockets 32 have been loaded thus to support 25 flowers in the mentioned generally square symmetrical relationship, the control means now actuates more extensive movement of the terminal conveyor 31 to bring the loaded group of pockets 32 thereon into the intermediate tying disposition and to simultaneously bring a previously tied group into the remote wrapping position and the successive group of unloaded pockets on the terminal conveyor 31 into a position as illustrated in FIG. 7 where the first unloaded pocket of the group of five pockets is in flower-receiving disposition. Conveniently, the mentioned control means can actuate a dog clutch 70 arranged to interconnect the link chain terminal conveyor 31 with a suitable electric motor 72 to effect the intermittent advance of the pockets 32.

Arrival of a group of five loaded pockets 32 at the central position of the terminal conveyor 31 is initially arranged to energize operation of the tying mechanism 33 which can be a standard tying machine, such as a Bunn Package Tying Machine, which is positioned at a suitable elevation for tying as best shown in FIG. 9 by a height-adjustment mechanism 74 in the form of a pair of vertical threaded rods 75 connected to a motor 76 which can be readily actuated to adjust the level of the tying mechanism 33 in accordance with stem length. Since such tying mechanism 33 is standard, no further detailed description thereof is requisite since it, in and of itself, forms no part of the present invention.

As shown most clearly in FIG. 9, the wrapping mechanism 34 for the tied flowers includes a pair of spools 82, 84 disposed at opposite sides of the wrapping station from which strips 78 of polyethylene sheet or other plastic material may be fed inwardly around a pair of vertical rods 86, 88, each incorporating a standard plastic heat sealing and severing mechanism as well known in the art with the extremities of the two strips 78 joined in such sealed relation. Slight frictional retardation of the spool rotation maintains a slight tension on the joined strips 78 so that prior to the wrapping operation the joined strips are disposed as shown in full lines in FIG. 9 at a position outwardly from the group of flowers at the wrapping station. After the tying operation operation has been completed, and the tied flowers moved by the conveyor 31 to the wrapping station, a pair of pneumatic rams 90, 92 are actuated to move the rods 86, 88 along curved tracks 94, 96 around the group of tied flowers until the two rods come into abutting position at the far side of the group of flowers as shown in phantom lines thus bringing the plastic strip material into stem encompassing relationship. When the two rods 86, 88 come into abutting position, the sealing mechanism is energized to join the plastic strips 78 at their extremities so that the group of flowers are fully encompassed and the extremities of the strips from the two spools 82, 84 are also joined. At this point, the pneumatic rams 90, 92 are retracted to the full-line disposition and the tied and wrapped group of flowers are withdrawn from their support on the pockets 32 preparatory to storage and shipment.

While manual control by an operator can be utilized to effect instigation of the various transfer operations, standard switches and electronic control circuitry is preferably utilized to render the operation fully automatic once the flowers F have been placed in the pockets 13 of the loading conveyor 10. It may be observed that one or more attendants can be positioned adjacent the one flight of the loading conveyor 10 depending upon its speed of operation although it will also be apparent that if a single operator is loading the unit, no deleterious effects will be experienced if, for example, one pocket 13 remains unloaded.

As the pockets 13 arrive simultaneously over the series of detector means 14a, 14b, 14c, etc., the described cam 15 actuates the microswitch 17 which, in turn, energizes all of the rams 44 to simultaneously energize all of the detector means to sense the stem lengths of flowers positioned thereover.

If a flower F has sufficient stem length so as to be sensed by one of the detector means 14a, for example, the associated microswitch signal means 41 is activated to energize the cam solenoid 61 to, in turn, raise the cam 54 into its upper operative disposition whereupon this particular flower F is transferred by the flower-transfer means 18a in the manner described in detail to one pocket 24a of the adjacent storage conveyor 21a. It will be observed that if a flower F of shorter stem length is sensed by another one of the detector means, at the same time, a simultaneous transfer of that flower F will take place to the associated storage conveyor, thus to expedite the entire process.

As the flower transfer means 18a completes transfer of a particular flower F, from a pocket 13 on the loading conveyor 10 to the adjacent pocket 24a on the storage conveyor 21a, a suitable microswitch (not shown) is energized to perform two functions. Closure of the switch energizes the ram 27 to move the storage conveyor 21a one step to bring an unloaded pocket 24a into flower receiving position. Secondly, a single control pulse is delivered to a standard electronic counter (not shown) which accumulates counts for subsequent instigation of additional control.

When the electronic counter has received 25 counts so that the storage conveyor 21a is completely filled, the counter energizes a switching mechanism, for example, in the form of a flip-flop circuit, to automatically effect, upon energization of the detector means 14a, delivery of flowers to the auxiliary conveyor 21b associated with that detector means so that further flowers of the same stem length are delivered to the auxiliary conveyor 21b while the filled storage conveyor 21a is being unloaded. Secondly, the 25 counts registered by the electronic counter instigate energization of the flower transfer means 62 associated with the transfer conveyor 29 by opening the gate 67 associated with the storage conveyor 21a thus to instigate unloading thereof and transfer of 25 flowers of the same stem length first onto the transfer conveyor 29 and then onto the terminal conveyor 31. When any one of the transfer means 62 is rendered operative, the other transfer means 62 are rendered temporarily inoperative so that no interference will occur but as soon as one storage conveyor 21a has been fully unloaded, and that associated flower transfer means 62 is deenergized, another transfer means 62 associated with another filled storage conveyor can immediately instigate its transfer of flowers from that storage conveyor through the transfer conveyor 29 onto the terminal conveyor 31.

As each flower F is transferred from the transfer conveyor 29 to the terminal conveyor pockets 32, another microswitch is energized to actuate a second electronic counter which, in turn, performs two functions. After five counts, the counter energizes the described dog clutch 70 to move the terminal conveyor 31 one incremental step to bring a second elongated pocket 32 into receiving position and, in turn, after all five pockets in a group have been filled, the counter having registered 25 counts, now moves the entire group to the tying station the prior tied group to the wrapping station and a group of unloaded pockets 32 to receiving position adjacent the transfer conveyor 29.

Arrival of a loaded group of five pockets 32 at the tying station closes an associated microswitch (not shown) which instigates the described operation of the standard tying mechanism 33 and simultaneous operation of the wrapping mechanism 80. The tying and wrapping operations can occur rapidly and will allow the instigation of loading of the next group of pockets 32 on the terminal conveyor during these operations. Thus in summary, the whole process can be carried out very rapidly with the minimum of attendant supervision.

What is claimed is:

1. A method for sorting flowers according to stem length comprising the steps of,
supporting flowers of random stem length at a single predetermined level from their bud ends into a general queue with the stems in suspended, substantially vertical parallel relation,
moving the general queue,
successively detecting the presence of flowers with stems longer than a preselected stem length along said general queue, and
transferring flowers with stems longer than a preselected length from said general queue to a storage queue of flowers suspended from their bud ends and having approximately the same stem length.

2. The method of claim 1 further comprising the step of, grouping flowers from said storage queue.

3. The method of claim 1 comprising,
detecting the presence of flowers of different stem lengths at different positions along the general queue, and
transferring flowers of different lengths to different storage queues, each arranged to store flowers of approximately the same stem length.

4. The method of claim 3 comprising the additional step of, selectively transferring a group of flowers from one of said storage queues to a grouped formation.

5. The method of claim 4 comprising the additional step of, tying the grouped flowers of similar stem length.

6. An apparatus for sorting flowers according to stem length comprising,
a loading conveyor having a series of pockets for holding random stem length flowers with the stems in parallel relation,
a plurality of detector means mounted along said loading conveyor for detecting the presence of flowers having stem lengths greater than a preselected stem length, each of said detector means being arranged to progressively detect lesser stem lengths,
a plurality of storage conveyors adjacent said loading conveyor, each having a plurality of flower pockets, and
first flower transfer means energized by each of said detector means for transferring flowers of similar length from said loading conveyor to a respective one of said storage conveyors.

7. The apparatus of claim 6 further comprising,
a transfer conveyor having a series of transfer pockets thereon for holding flowers, said transfer conveyor disposed adjacent said storage conveyors,
second flower transfer means adjacent each of said storage conveyors for loading the pockets of said transfer conveyor from a selected one of said storage conveyors, and
means associated with each storage conveyor for energizing the associated one of said second flower transfer means so that said transfer conveyor receives flowers from a selected storage conveyor.

8. The apparatus of claim 7 further comprising,
a terminal conveyor carrying a series of multiple flower pockets and arranged to receive flowers from said transfer conveyor, and
third flower transfer means for transferring flowers from said transfer conveyor pockets to the pockets of said terminal conveyor.

9. The apparatus of claim 8 wherein,
said second and third flower transfer means include a cam follower supporting each of said transfer conveyor pockets as a common element.

10. The apparatus of claim 8 wherein,
said multiple flower pockets on said terminal conveyor support flowers in a symmetrical substantially square grouping to facilitate tying and wrapping thereof.

11. The apparatus of claim 8 which comprises,
means for tying flowers grouped on said terminal conveyor pockets, and means for wrapping a tied group of flowers on said terminal conveyor, the transfer, tying and wrapping means being positioned at displaced positions along said terminal conveyor.

12. The apparatus of claim 7 wherein,
said second flower transfer means includes a pivoted cam follower with a roller arranged to engage a cam track adjacent the end of each storage conveyor, and
said energizing means includes a normally-closed gate at one end of said cam track arranged, upon energization, to open wherefor said roller may engage said cam track.

13. The apparatus of claim 12 wherein,
each of said transfer conveyor pockets include a pair of tines curving outwardly and forwardly from said cam follower.

14. The apparatus of claim 6 wherein,
said first flower transfer means includes a pair of tines spaced to receive a flower stem, said tines being mounted in a rack,
a cam follower with a cam surface having said rack rotatably attached on a first edge portion mounted to said storage conveyor so that flowers received in said tines will move in response to motion by said cam follower, and
a cam movable into position for engagement by said cam follower cam surface.

15. The apparatus of claim 14 wherein,
said first flower transfer means includes cam follower guide means movably connected to said cam follower and to said rack for adjusting the angular position of said rack so that a flower held therein may be guided to a desired position when a cam abuts said cam follower.

16. The apparatus of claim 14 wherein,
each of said detector means actuates movement of a respective cam into cam follower engaging position.

17. The apparatus of claim 16 wherein said detector means for detecting the presence of flowers of preselected stem lengths held in the pockets of said loading conveyor comprises,
a shelf mounted under said pocket at a preselected stem length,
an arm subject to bending mounting a blade arranged to move toward and from said shelf in a non-intersecting path therewith, said path being transverse to said flower stem positions, said arm being bent when a flower stem becomes lodged between said blade and shelf, and
signal means associated with said arm for indicating bending thereof and operative to energize movement of said cam.

18. The apparatus of claim 17 wherein said arm subject to bending comprises a pair of hinged members with a first member mounting said signal means including a switch and a second member mounting a finger for tripping said switch upon bending of said arm thereby activating said signal means.

19. The apparatus of claim 6 wherein each storage conveyor has an associated auxiliary storage conveyor connected to receive flowers after each storage conveyor becomes filled.

20. The apparatus of claim 19 further including,
a counter associated with each of said storage conveyors for counting flowers stored thereon, said counter being capable of signaling when said storage conveyor becomes filled and capable of energizing said associated auxiliary storage conveyor for receiving flowers.

21. An apparatus for detecting the flowers having a stem length greater than a preselected length comprising,
a shelf mounted under said flower at said preselected stem length, an arm subject to bending mounting a blade arranged to move toward and from said shelf in a non-intersecting path therewith, said path being transverse to said flower stem position, said arm being bent when a flower becomes lodged between said blade and shelf, and signal means associated with said arm for indicating bending thereof.

* * * * *